United States Patent
Rabinov et al.

(10) Patent No.: US 12,056,387 B2
(45) Date of Patent: Aug. 6, 2024

(54) WRITING AND READING DATA SETS TO AND FROM CLOUD STORAGE FOR LEGACY MAINFRAME APPLICATIONS

(71) Applicant: BMC Software, Inc., Houston, TX (US)

(72) Inventors: David Rabinov, Netanya (IL); Roded Bahat, Haifa (IL); Dori Polotsky, Ramat Gan (IL); Offer Baruch, Gannei Tikva (IL); Tomer Zelberzvig, Rehovot (IL); Gil Peleg, Kiryat-Ono (IL); Mark Gordon Perry, Livardia Larnaca (CY); Shy Ifrah, Ashdod (IL)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 17/832,328

(22) Filed: Jun. 3, 2022

(65) Prior Publication Data
US 2023/0393778 A1  Dec. 7, 2023

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC ............................... G06F 3/0604; G06F 3/067
See application file for complete search history.

(56) References Cited

U.S. PATENT DOCUMENTS

| | | | | |
|---|---|---|---|---|
| 3,664,066 A | * | 5/1972 | Clark, Jr. | B24B 5/04 451/142 |
| 6,115,781 A | * | 9/2000 | Howard | G06F 3/0659 711/147 |
| 2006/0294127 A1 | * | 12/2006 | Nettles | G06F 40/126 |
| 2014/0010517 A1 | * | 1/2014 | Sheffler | H04N 21/231 386/226 |
| 2017/0300240 A1 | * | 10/2017 | Gorlinsky | G06F 3/0661 |

(Continued)

OTHER PUBLICATIONS

Ogden, IBM zPDT Guide and Reference System z Personal Development Tool, IBM, 2015 [retrieved from internet Jul. 14, 2022][<URL:http://itconline.com/wp-content/uploads/2016/04/redbooks.pdf>] (Year: 2015).*

(Continued)

*Primary Examiner* — David Yi
*Assistant Examiner* — Nicholas A. Paperno
(74) *Attorney, Agent, or Firm* — Brake Hughes Bellermann LLP

(57) ABSTRACT

Methods, and computer program product for writing data sets to and from cloud storage for legacy mainframe applications. A call to a mount request issued by the operating system is intercepted. An exit call to prepare for dataset write is received from an OS open routine. At least one call to a Basic Sequential Access Method (BSAM) End of Block (EOB) write routine is intercepted. Subject to the at least one call to the BSAM EOB routine being associated with cloud storage, data chunks are sent in an asynchronous manner to cloud storage. A second exit call for finalizing writing of the data chunks to the cloud storage is received. A call to an unmount request is intercepted. As a result, data is written directly from the mainframe to the cloud storage without intermediate storage.

13 Claims, 3 Drawing Sheets

(56) References Cited

U.S. PATENT DOCUMENTS

Figure 1:
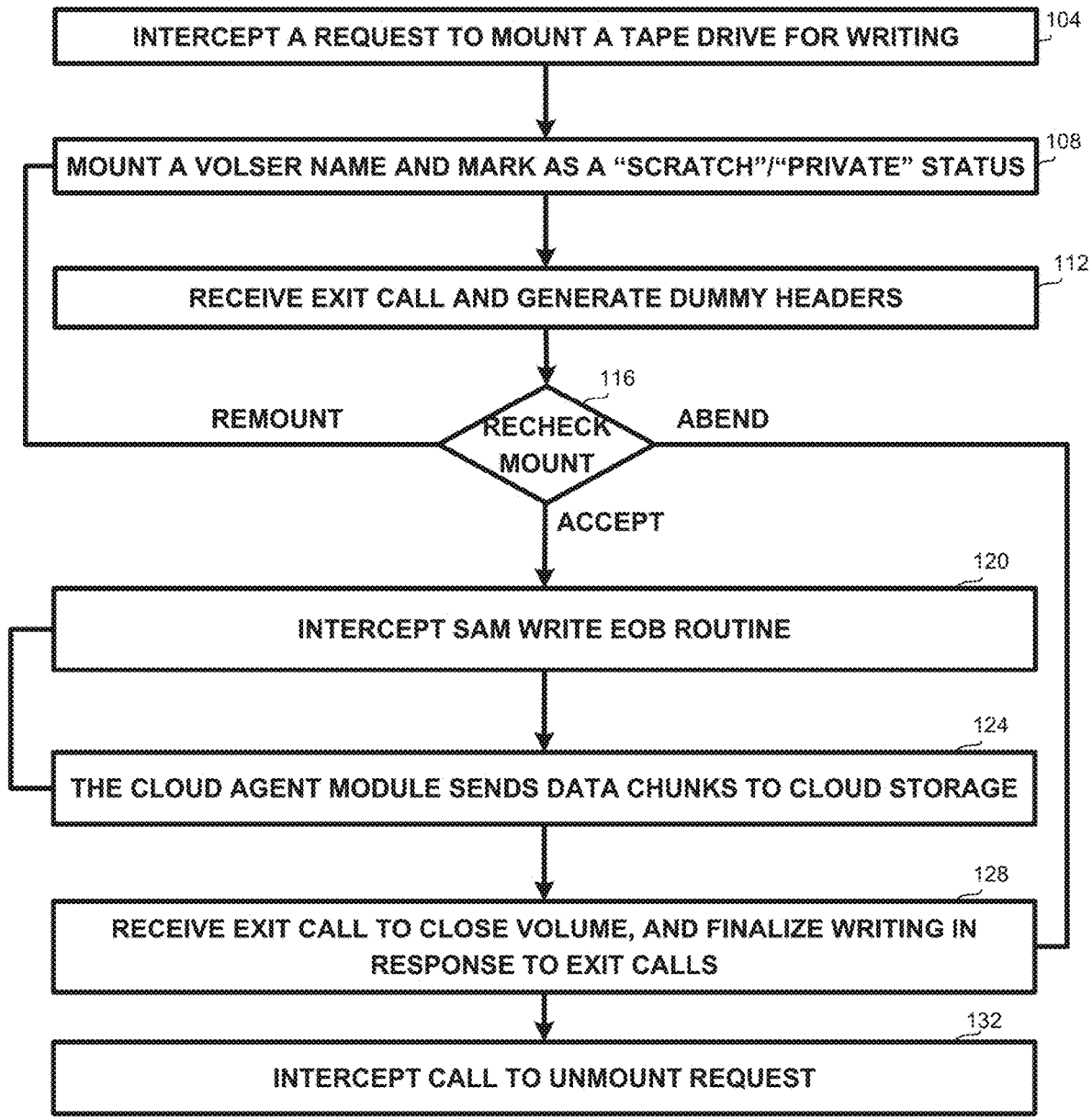

| | | | | |
|---|---|---|---|---|
| 2020/0004561 | A1* | 1/2020 | Kottler | G06F 40/174 |
| 2020/0133885 | A1* | 4/2020 | Tshouva | G06F 21/577 |
| 2020/0151064 | A1* | 5/2020 | Narula | G06F 16/26 |
| 2020/0272353 | A1* | 8/2020 | Ainscow | G06F 3/0605 |
| 2020/0351347 | A1* | 11/2020 | Chang | G06F 9/45558 |
| 2021/0232331 | A1* | 7/2021 | Kannan | G06F 3/0631 |
| 2021/0232458 | A1* | 7/2021 | LeCrone | G11B 5/00813 |

OTHER PUBLICATIONS

IBM, z/OS Version 2 Release 4 DFSMS Using Magnetic Tapes, 2020, [retrieved from internet Jul. 13, 2022][<URL:https://www-40.ibm.com/servers/resourcelink/svc00100.nsf/pages/zOSV2R4sc236858/$file/idam300_v2r4.pdf>] (Year: 2020).*

Access Method, Mainframestechhelp, Jul. 26, 2021 [retrieved from internet Jul. 26, 2023][<URL:https://web.archive.org/web/20210726054407/https://www.mainframestechhelp.com/tutorials/vsam/file-access-methods.htm>] (Year: 2021).*

* cited by examiner

WRITING AND READING DATA SETS TO AND FROM CLOUD STORAGE FOR LEGACY MAINFRAME APPLICATIONS

TECHNICAL FIELD

The present disclosure relates to mainframe computers in general, and to a system and method for enabling applications executed by mainframe computers to read and write data from/to cloud storage, in particular.

BACKGROUND

Mainframe computers traditionally use tapes as storage devices, and in particular for large volume applications, involving database and backup/restore. Applications use tapes as primary storage for large data sets to avoid using expensive disk space, and can store temporary work data sets in long batch jobs, logs, audit files, data for long retention periods, or the like.

A system can have one or more tape drives which are physical or virtual devices that allow the mounting of tape cartridges, each having a name consisting of six letters, also referred to as volume name or volser. The tape may be mounted and used in one of a number of available label formats. The most common label format is Standard Label (SL), and additional ones are No Label (NL), Standard User Label (SUL) and others.

Tapes are serial devices, meaning that blocks are written and read one after the other. In addition, each tape also stores:

VOL1: Tape volume header which among other things include the volume name

HDR1/HDR2: data set level headers which include information about the data set

TM: Tape Mark is a hardware mark representing end of physical tape file

EOF1/EOF2: data set level trailers which include information about the data set

TM: two tape marks representing the end of the tape

Thus, a single data set tape will contain: VOL1, HDR1, HDR2, TM, File data block 1, . . . file data block N, TM. EOF1, EOF2, TM, TM.

A multi data set will contain: VOL1, HDR1, HDR2, [TM, File-1 data block 1, . . . File-1 data block N, TM, EOF1, EOF2, TM], one or more repetitions of the blocks in the square parenthesis above, TM.

Applications can write one or more data sets on a tape cartridge, one after the other. Each data set has a sequence number which is assigned incrementally. Applications can write multiple data sets having the same name, wherein each data set is written on a different tape volser, such that the volser represents a specific version of the data set name.

When an application has to write a new data set to a tape cartridge, it asks for a "Scratch" (i.e., free) tape cartridge, meaning that writing a new data set at the beginning of a tape cartridge deletes all other data sets written on the tape. Therefore, the same tape cartridge cannot be mounted in more than one tape drive at the same time, and the z/OS operating system forbids multiple cartridges with the same volume name to be mounted in parallel for read or write.

Data is written to tapes in blocks, wherein each tape device type has a maximum and optimal block size. Legacy programs can work with a maximum block size of 64K, which implies that many write requests are required for large files. Modem physical or virtual tape devices support a block size of 256K to reduce the overhead of many writes. However, in order for an application to use block sizes larger than 64K it must use a special interface known as the Large Block Interface (LBI).

Tape operation and management have many disadvantages, related both to management and maintenance of the tapes and associated software, and to the limitations and suboptimal performance of programs caused by the usage of tapes for storing data.

BRIEF SUMMARY

One exemplary embodiment of the disclosed subject matter is a computer-implemented method performed by a mainframe computer executing an application, the method comprising: intercepting a first call to a mount request issued by the operating system (OS) in response to the application allocating a dataset request on a scratch volume identifier; receiving from an OS open routine, a first exit call to prepare for dataset write; intercepting one or more second calls to a Sequential Access Method (SAM) End of Block (EOB) write routine; subject to the second calls to the SAM EOB routine being associated with cloud storage, sending in an asynchronous manner data chunks to cloud storage; receiving from an OS close routine a second exit call to for finalizing writing of the data chunks to the cloud storage; and intercepting a third call to an unmount request, thereby writing data directly from the mainframe to the cloud storage without intermediate storage.

Another exemplary embodiment of the disclosed subject matter is a computer-implemented method performed by a mainframe executing an application, the method comprising: intercepting a first call to a mount request issued by the OS in response to the application allocating a dataset request on a volume identifier; receiving from an OS open routine, a first exit call to prepare for dataset read; intercepting one or more second calls to a Sequential Access Method SAM EOB read routine; subject to the second calls to the SAM EOB read routine being associated with cloud storage, reading in an asynchronous manner data chunks from cloud storage; receiving from an OS close routine a second exit call to for finalizing reading from the cloud storage; and intercepting a third call to an unmount request, thereby reading data directly from the cloud storage without intermediate storage.

Yet another exemplary embodiment of the disclosed subject matter is a computer program product comprising a computer readable storage medium retaining program instructions for using cloud storage by a mainframe computer executing an application, the program instructions comprise: a cloud agent module executed by the mainframe computer for communicating with the cloud storage; one or more first routines implementing low level I/O control events of the mainframe computer, including at least mount and unmount routines, said first routines substituting one or more OS routines executed by the mainframe computer; a SAM EOB routine for calling the cloud agent module to transmit or retrieve data from the cloud storage, the SAM EOB routine substituting an OS routine; and one or more exit routines, called for Open, Close and End of Volume related events, said exit routines sending notifications to the cloud agent module. Within the computer program product, the computer program product optionally comprises program instructions for storing and retrieving one or more data objects to and from the cloud storage in parallel. Within the computer program product, the computer program product optionally comprises program instructions for storing and retrieving two or more data objects to and from the cloud storage in an order other than an order in which the data objects are referred to by the application executed by the mainframe computer. The computer program product may further comprise a cloud data management module for providing user interface for a user of the mainframe computer. The computer program product optionally causes the application executed by the mainframe computer to store data on the cloud storage directly, thereby avoiding temporary storage on a local disk. Within the computer program product, the cloud agent module is optionally adapted to encrypt data prior to transmitting the data to the cloud storage, and decrypt the data when reading from the cloud storage. Within the computer program product, the cloud agent module is optionally adapted to compress data prior to transmitting the data to the cloud storage, and decompress the data when reading from the cloud storage. Within the computer program product, the cloud agent module is optionally adapted, upon a request by the application, to filter or sort read data prior to providing the data to the application. Within the computer program product, the cloud agent module is optionally adapted, upon a request by the application, to read a data set directly from a backup, archive, full volume dump, a Unix file backup or an open system file residing on the cloud storage.

THE BRIEF DESCRIPTION OF THE SEVERAL VIEWS OF THE DRAWINGS

Figure 2:
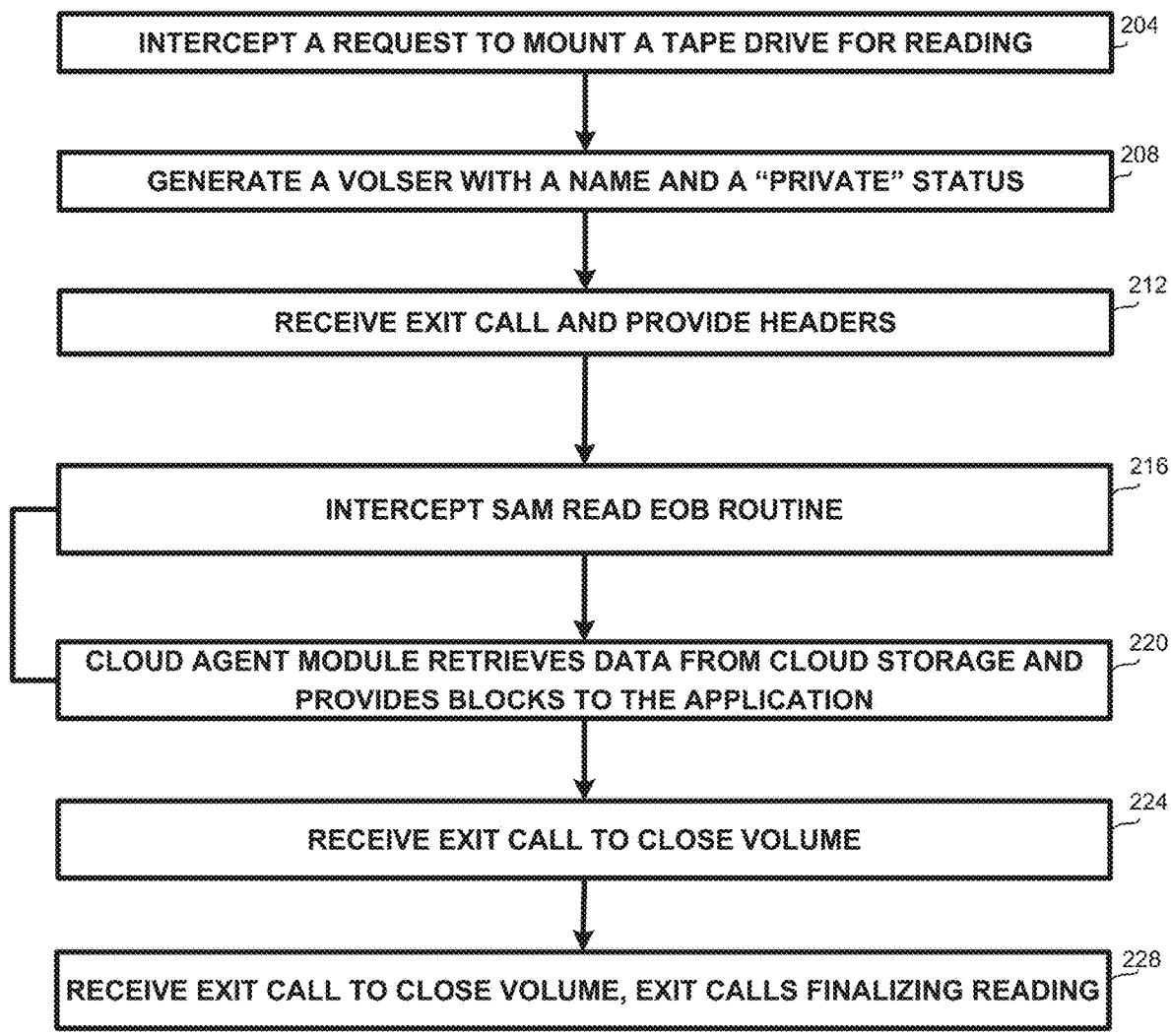
Figure 3:
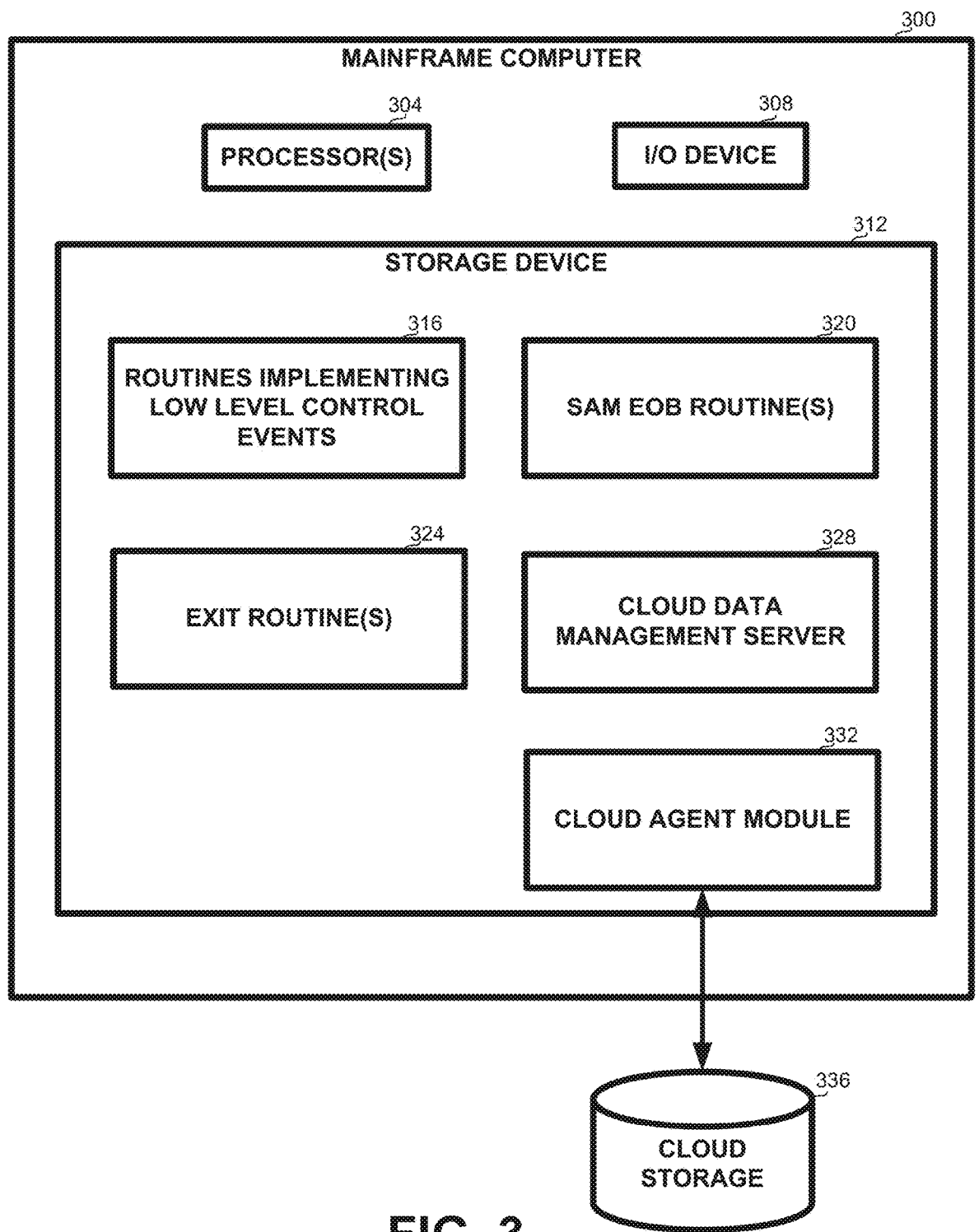

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 is a flowchart of steps in a method for implementing writing to a cloud storage device by an application executed by a mainframe computer, in accordance with some exemplary embodiments of the disclosure;

FIG. 2 is a flowchart of steps in a method for implementing reading a cloud storage device by an application executed by a mainframe computer, in accordance with some exemplary embodiments of the disclosure; and FIG. 3 is a block diagram of a mainframe computer configured to enable an application to write to and read from cloud storage device, in accordance with some exemplary embodiments of the subject matter.

DETAILED DESCRIPTION

Mainframe computers traditionally use tapes for data storage. However, tape operation and management have many disadvantages. Beyond the huge physical storage space required for storing millions or more of tapes, managing the volumes incurs significant complex and expensive software and CPU overhead. In addition to the significant tape volume database, multiple management databases are maintained including a tape library database, operating system (OS) volume catalog (VOLCAT) and tape management software database. In addition, the tape inventory needs to be managed, including adding, deleting and modifying volume status, location, or the like, and management of tapes for backup and restore operations.

As for application execution, a significant drawback of tapes is that tapes are serial devices, meaning that blocks are written and read one after the other, and no direct access to the data is enabled, which leaves very little, if any, flexibility in the storage and particularly when reading the data.

Another significant drawback is that the maximum block size when using tape is 256K. As tape is a serial media, this limitation forces the program to write a certain amount, for example 256K, at a time, which affects throughput and performance.

Tapes also suffer from significant latency which dramatically affects the application performance. Another type of disadvantage relates to the inherent limitations, including mainframe architecture limitations on the number of tape drives that can be present at the same time, and mainframe architecture limitations on the number of tape volumes, since the volume name is limited to six characters. Further difficulties relate to the tape volume and data set expiration and the need to merge tape volume to release partly full tape volumes. Additionally, the tape capacity cannot be released for other processing until all data sets on that tape have expired; users are forced to create stack data sets serially on a single tape volume to avoid wasting tape volumes and space, which in turn makes it harder to free a tape volume if data sets have different expiration attributes; and different tape models have different capacity limitations, which makes it even harder to manage the tapes.

Thus, tapes and other current solutions have significant drawbacks and limitations, including but not limited to the complexity and cost of maintaining both the physical tapes and the management software, the inherent usage limitations, the seriality and block size limitations of tapes, the poor performance and others.

As the cost of conventional hard drives decreased, Virtual Tape Libraries (VTLs) were introduced, which allow execution of programs designed for tapes, but behind the scenes actually store data on hardware that is based on cheap hard disks.

However, current solutions, do not solve many of the problems, including the need for mainframe-specific on-premises storage, the coupling of code to the tapes and in particular the seriality architecture limitation of tape devices, as VTLs present themselves to the application as a real tape. Although the VTLs provide faster mount and slightly better time performance than that of tapes, it still has multiple drawbacks and is inferior to modern storage.

Some software solutions were introduced, such as Transparent Cloud Tiering (TCT), Cloud Tape Connector (CTC) and others, which attempt to solve these problems. However, none of them provides a satisfactory solution, as they depend on implementation details of tapes and are coupled with their code and existing scripted tasks (e.g. JCLs).

Thus, one technical problem of the disclosure relates to the need to enable programs executed by a mainframe computer, also referred to as applications, and in particular legacy programs, to write and read data to and from cloud storage devices, including public or private cloud storage systems, whether on-premise or remote. The disclosure is particularly relevant to mainframe computers running the z/OS operating system. The cloud storage device may be an object storage, storing objects of arbitrary size. The programs cannot or should not be changed, and thus need to operate in their traditional manner, without any change caused by the reading and writing being to and from cloud storage rather than physical or virtual tapes. Thus, the programs may call tape-related commands such as allocate, rewind, open, close, read, write, free, or the like, and may indicate the type of drive and media it requires, or other parameters. The applications should receive responses to these commands, wherein the responses should be such that the program may keep running and its goals achieved, although in the background no tape is involved but rather cloud storage.

The programs may include, but are not limited to, programs written in Cobol. PL1, Fortran, HLASM or any other programming language or environment. The type of data written to and read from the cloud storage is not limited to backups and restores, but may include, but is not limited to, databases, long term storage, or the like.

Another technical problem of the disclosure relates to the need to provide to the programs the advantages of cloud storage, including but not limited to: reading and/or writing one or more data objects in asynchronous or parallel manner, whether the data objects are written in the same file or not, and regardless of the supported number of drives or the block size limitations, thus providing for more efficient writing, read-ahead, or the like.

Yet another technical problem of the disclosure relates to the reading and writing being performed directly to the cloud storage system, without requiring on-premise storage of the data, or any other device or equipment, thereby saving significant execution time, computing resources, floor space and cooling costs.

Yet another technical problem of the disclosure relates to the need to perform additional processing on the data to be stored and retrieved, such as encoding the decoding the data, compressing and uncompressing the data, or the like. Further processing may relate to the data itself, such as filtering, sorting, or the like. Even further processing may relate to directly reading a previously generated data set backup, archive, full volume dump, a Unix file backup or open system file residing on the cloud storage.

One technical solution of the disclosure comprises catching the I/O calls made by the program or by the operating system (OS), but not at the hardware level where tape-related instructions are actually issued, but at the Basic Sequential Access Method (BSAM) level, where significantly fewer call types are received. Thus, there are a lot less instruction types to be handled, while still obtaining control over all outgoing commands that address the tape drive. If the command is aimed at a tape drive and not at cloud storage, it is not affected, and is executed in the ordinary manner. It will be appreciated that a mainframe computer may also operate with Queued Sequential Access Method (QSAM). However, the QSAM eventually uses BSAM, therefore by operating at the BSAM level, both access methods are handled.

Thus, a system in accordance with the current disclosure comprises a cloud agent module executed by the mainframe computer, for communicating with the cloud storage, for example opening a file, writing data to the file, reading data from a file, and closing the file. The cloud agent module may be implemented in a modern language, such as Java, Python, or the like. The cloud agent module may be activated upon the receipt of commands in the block level, i.e., BSAM commands. However, the cloud agent module does not necessarily operate at the block level. Rather, when writing data, the cloud agent may accumulate multiple blocks of data from multiple calls, and may send chunks of the data to the cloud storage in parallel manner. When reading, the cloud agent may read ahead and retrieve more data than the single block requested, and then provide the data when needed without having to address the cloud storage again. The cloud agent module may perform additional operations over the data, such as encryption and decryption, compress and decompress, filtering, sorting, or the like. It is appreciated, that cloud agent may also, upon a request by the application, read a data set directly from a backup, archive, full volume dump, a Unix file backup or an open is system file residing on the cloud storage. The agent can stream the data through the standard z/OS access methods such as QSAM or BSAM, thereby opening up mainframe applications to not only read tape data sets, but also backups, archives, or the like, which is impossible with tape technology.

The cloud agent module, and some of the components detailed further below may be executed by a zIIP processor in order to reduce processing by a General Central Processing (GCP), and thereby reduce the total cost incurred by the program. Operations such as but not limited to compression, encryption, management or others may all be executed by zIIP, leaving mainly the low level I/O methods, which consume relatively low CPU consumption, to be performed by GCP.

The system may further comprise routines implementing low level I/O control events, also referred to as StartIO, of the mainframe computer, including at least mount and unmount routines. The routines are referred to as Virtual Device (VDEV), for operations related to allocation and deallocation of cloud data sets, such as online, offline, mount, unmount, rewind, or the like. The VDEV routines may implement further control events, such as Seek, Back-Space and others in order to comply with fundamental tape operations that an application might invoke manually. It will be appreciated that it is not required to imitate or fully virtualize tape drives, as this will maintain also the associated drawbacks. The handled events provide for satisfying the operating system requirements, such that the operating system can continue operating as it does for a tape drive.

The system may further comprise implementations of exit calls for open, close, and end of volume related events. The exit calls comprise code which is called by the operating system when processing these commands, such that control is provided to the user's code. The implementation of these exit calls may send commands or notifications to the cloud agent module to start processing events according to a memory area, such as a shared memory communication area, containing the meta-data needed for the operations. In some embodiments, a single exit routine may be provided, handling open, close and end-of-volume events, while in other implementations separate exit routines may be provided.

The system may further comprise implementations of tape SAM read/write End of Block (EOB) routines. These routines replace the original OS routines, but call the original OS routines if the executing application is working with tapes and not with cloud storage. Additionally, for any non-cloud data set related work, the routines are switched back to the original OS routines, and no further calls are made to these implementations for this data set. Additionally, when cloud storage is used, the SAM EOB events are handled on a higher level without the need for handling low level I/O events. additionally, low level IO events generate work running in an SRB, being the highest priority unit of work for handling IO responses) The SRBs do not exist when working with cloud, thus the disclosure provides for reducing some amount of CPU which is running at the highest priority in the system.

The system may further comprise additional components, such as a user interface (UI) component, name generation component, or the like.

Another technical solution of the disclosure relates to a method for an application executed on a mainframe computer, to write data to a cloud storage device. The method comprises intercepting a call to a mount request issued by the OS, the mount request issued in response to the application trying to allocate a dataset request for a volume. Upon intercepting the call, a name and label is generated for the volume. When the application continues executing, one or more exit calls may be received from the OS to prepare for writing. Further calls to SAM EOB routines may then be intercepted. If the writing is associated with the cloud storage, upon one or more of the intercepted calls, a call may be made to the cloud agent module to send chunks of data to the cloud for storage. Upon each such call to the cloud agent module, one or more chunks may be sent to the cloud storage in parallel, in an asynchronous manner, or in any other manner. In some embodiments, the cloud agent module may compress, encrypt or otherwise manipulate the data prior to sending it to the cloud storage.

A call to a second exit function may then be received for finalizing the writing of the data chunks to the cloud storage, followed by intercepting a call to an unmount request. Once the tape is unmounted the data set is free, the data is safely stored in the cloud and the job is done.

A corresponding sequence may be implemented for reading a file, in which upon calls to the SAM EOB read routine, data is read from the file, also in parallel and unsynchronous manner. The data may be decoded, decrypted and/or decompressed, if it was encoded, encrypted and/or compressed, respectively, prior to being stored. Moreover, "read ahead" may be performed, meaning that data may be read earlier than requested, such that once requested the data will be available with no I/O delay.

One technical effect of the disclosure is the provisioning of a method and system for enabling programs executed by mainframe computers, including legacy programs, to read and write data from and to cloud storage rather than virtual or physical tape drives. Writing to cloud object also enables storing objects of arbitrary size, which may not be possible using tape drives. The programs can continue their normal operation without any change. However, the overhead of physical purchasing, storing and managing the tapes and tape drives, and the software required for their handling, including the tape library database, OS volume catalog (VOLCAT) and tape management software is saved. The disclosure also provides for eliminating the need for merging half-empty tapes, handling expiration attributes of tapes, recycling tapes, and others.

Another technical effect of the disclosure comprises the advantages of using cloud storage, including the drastic reduction in latency caused, among others, by the enabled parallel reading and writing, elimination of the number of tape drives and tape volumes, elimination of the serial reading and writing, and removing the block size limitation, thereby making the programs more efficient and saving processing resources.

Yet another technical effect of the disclosure relates to eliminating the need for on-premise storage and any other hardware but the mainframe itself, for example on-premise servers, thus also speeding up execution of the programs.

Yet another technical effect of the disclosure relates to enabling processing of the stored data, including encoding the data before writing and decoding when reading, thereby providing enhanced security measures for the programs, compressing the data before writing and uncompressing when reading, thereby requiring less time and fewer communication resources, or other processing that enhances performance, efficiency, security or the like.

Referring now to FIG. 1, showing a flowchart of a method for implementing writing to a cloud storage device by an application executed by a mainframe computer, in accordance with some exemplary embodiments of the disclosure.

In order to be able to write to a storage device, any such application issues a request to the OS for allocating a dataset request on a scratch or a specific volume identifier. The application may select to work with a virtual tape, which in reality is associated with cloud storage and is registered with the OS and available for the application, such that the application behaves the same as if the data is written to a tape and not to a cloud storage device. The OS, upon receiving the request issues a mount request.

The OS will issue a mount request for a PRIVAT volume which is a request for a SCRATCH status tape volume, or a specific volume.

On step 104 the mount request issued by the OS is intercepted by a virtual device routine implementing low level I/O control events, substituting the OS corresponding routines. If the mount request is indeed associated with writing to a cloud storage device, as may be set when starting the application execution proceeds as detailed below. The setting can be performed in a number of manners, such as changing the application Job Control Language (JCL) to point at the cloud devices, using OS component storage management subsystem (SMS) to automatically redirect the allocation to the cloud devices, or others.

Otherwise, the previous OS routine for allocating a tape drive for writing is called and proceeds as usual. For example, other programs may intercept the StartIO. Thus, execution may return to the previous routine that caught the StartIO and not necessarily to the operating system routines.

In response to intercepting the call, on step 108, the routine automatically mounts a volser, wherein the volser name is only subject to the uniqueness name limitation of the currently mounted tape volumes. Thus, the same volume name can be used multiple times to write multiple data sets on the same tape on the same location on the tape, hence reducing the limitation of the number of usable tapes. However, the name does need to comply with the 6-character limitation. Additionally, the status of the selected volume name is set to SCRATCH or PRIVATE.

It will be appreciated that since no tape drive is involved, this routine simulates the loading of a tape but does not have any impact beyond returning to the program the expected volume name.

Once allocation is done, from the application's point of view there is a tape in the tape drive and it may proceed, although in reality there is no tape drive, and writing will be done to cloud storage.

The application may then continue to open a data set on the volume. During the OS "open" routine, a call to an exit routine is made by the OS, i.e., a call to a user-provided routine. In some exemplary embodiments, separate exit routines may be provided for open, close and end of file events, however in other embodiments, one or more exit routines may be used for two or more such events.

On step 112, as part of the exit routine, a call to the cloud agent module may be made, and dummy headers, including the volser, may be generated and returned to the OS. The OS may verify that the volser is unique and not actively in use, and possibly performs other checks.

The exit routine may also call the cloud agent module to verify that the volume is indeed ready for writing, and that the volume name is unique such that no two programs use the same volser name at the same time, and to make preparations for writing. If the cloud agent module returns a "remount" decision, execution may return to step 108, if the decision is "Abend" (abnormal end), the exit routine may return an error message, after which the file will be closed and operation may continue to step 128. Otherwise, the decision is "Accept" and the process may continue.

At this stage, the OS may prepare and attempt to write new headers for the file. These routines may be intercepted and the headers may be changed, although they may or may not be actually stored within the file. A further exit call indicating the actual opening of the file may be received.

The application may then issue a series of write commands, the data to be written is stored by the operating system until a full block is to be written to the drive. When using a tape drive, a SAM Write EOB routine is called, which is the point where an I/O command is issued. The calls to the SAM EOB routine may be intercepted on step 120, and if cloud storage is used, the data blocks collected in memory may be provided to the cloud agent module for writing.

On step 124, the cloud agent module may send the data accumulated in memory to storage on the cloud. The agent may not send each such block, but rather accumulate larger chunks. Sending may be performed in an asynchronous manner, in parallel, and not necessarily in serial manner as in tape devices. The cloud agent module is may also change the data, e.g., compress, encode, encrypt or otherwise manipulate it, for example in a reversible manner.

Thus, upon the interception of the SAM EOB routine, no I/O command is output by the OS, and no writing attempt is done. This is unlike current solutions that catch the actual I/O call and change the actual writing.

After all writing commands are being sent from the application, the application may issue a close command to the OS. On step 128, an exit call issued by the OS in response to the close command may be received.

Then, in response to another exit call, the cloud agent module may finalize the writing, for example finish writing the data, store mapping and link objects, store labels, and update the label block count. If anything was unsuccessful, an ABEND may be returned, such that the application is notified that the Close failed, and the file was not written as expected.

After the close was approved on step 128, the VDEV may simulate writing the End of File trailers and Tape Marks, or simply report it so did.

On step 132, a call to unmount request issued by the OS in response to the application issuing a free command, may be intercepted. The routine may free the volser name, and the operating system may then end the job, and update the z/OS catalog such that the file can be found.

Thus, when implementing the method, the only I/O commands that are actually performed by the VDEV are those related to the mount, unmount and header writing, while other types of commands are handled via the BSAM routines, thereby significantly simplifying the solution relative to currently known methods.

Referring now to FIG. 2, showing a flowchart of a method for implementing reading from a file stored in a cloud storage device by an application executed by a mainframe computer, in accordance with some exemplary embodiments of the disclosure.

In order to be able to read from a volume, any such application needs to issue a request to the OS for allocating a data set on a volume. The OS, upon receiving the request issues a mount request.

Thus, on step 204 the mount request issued by the OS is intercepted by a is routine implementing low level I/O control events. If the mount request is indeed associated with reading from a cloud storage device, as may be set when starting the application by the tape drive if the tape drive is associated with clouds storage, execution proceeds as detailed below. Otherwise, the ordinary routine for allocating a tape drive for reading is called and proceeds as usual.

In response, on step 208, the low level I/O routine automatically verifies that the provided name is unique and no other volume by the same name is being used. If there is a problem, another name may be generated to ensure uniqueness. This mechanism enables a number of applications to read from the same volume name. Additionally, the status of the selected volume is set to "PRIVATE".

It will be appreciated that since no physical/virtual tape drive is involved, this routine simulates the loading of a tape but does not have any impact beyond returning the information to the program.

The application may then continue to open the data set on the volume for reading. During the OS "open" routine, an exit call is made by the OS.

On step 212, as part of the exit call, a call to the cloud agent module may be made, and a file may be opened. The cloud agent module may verify that the mount was successful, and may prepare for reading. The cloud agent module may try to read the headers from the cloud, and change them to the one stored in the cloud storage. The cloud agent module may also start reading the file contents, for example in an asynchronous manner, and possibly in parallel.

The application may then issue a series of read commands, followed by a call to SAM Read EOB routine. The calls to the SAM Read EOB routine may be intercepted on step 216.

If cloud storage is used, then on step 220 the data may be retrieved from the file by the cloud agent module and provided to the application. It will be appreciated that during the application execution, the cloud agent module may continue retrieving the data from the cloud storage, including read ahead, where data is retrieved from the cloud storage before it is requested by the application, such that once the SAM read EOB routine is intercepted, the data may be provided without further delays. Having the information ready ahead of time may provide for operations such as skipping one or more blocks, going back one or more blocks, or the like.

If the data is compressed, encrypted or otherwise manipulated, the cloud agent module may do the opposite operation, i.e., uncompress, decrypt, or the like. Since the cloud agent module may be implemented in a high-level language, complex operations may be performed over the data, such as sorting, filtering (for example in accordance with instructions provided by the application, such as filter only records in which column 3 has values between 6 and 9). Additional operations may include generating random or structured data, for example by programs such as IEBDG, masking some data, columns, or the like, for example masking passwords stored in the file with a dummy string such as "****", or the like.

On step 224, after all reading commands are being sent from the application, when the last block is received the cloud agent module may read the trailers and tape marks from the cloud storage, for example for verification purpose. If there is discrepancy between the read trailers and the data that was actually read, the cloud agent module may report this, and the result may be returned to the application.

When all required reading is done, the application may issue a close command to the OS. On step 224, an exit call issued by the OS in response to the close command may be received. The VDEV may report rewinding the volume, although no such action can or needs to be done, since no tape is involved.

On step 228, a call to unmount request issued by the OS in response to the application issuing a free command, may be intercepted. The routine may unallocate, i.e., free the volser name, and the operating system may end the job. Thus, no more reading will be performed even if additional data is available for reading.

It will be appreciated that the methods of FIG. 1 and FIG. 2 above avoid the need to write data to temporary storage. Since prior art methods operate at the I/O level, they need to return immediately, and cannot re-try to write or read if communication problems exist. The disclosed methods, however, can re-try to read or write at a later time, and thus do not need such temporary on-premise storage. Additionally, the retires also allow for recovering from errors without terminating the application.

Referring now to FIG. 3, showing a generalized block diagram of a mainframe is computer configured to enable an application to write to and read from cloud storage device, without introducing changes to the application, in accordance with some exemplary embodiments of the subject matter.

A mainframe computer is a computer used primarily by large organizations for critical applications, bulk data processing, industry and consumer statistics, enterprise resource planning, transaction processing, or other tasks.

Mainframe computer 300 may comprise a processor 304. Processor 304 may be a Central Processing Unit (CPU), a microprocessor, an electronic circuit, an Integrated Circuit (IC), a Central Processor (CP), a System Z Information Integration Processor (zIIP), a System Z Application Assist Processor (zAAP), or the like. Processor 304 may be utilized to perform computations required by the apparatus or any of its subcomponents.

In some exemplary embodiments of the disclosed subject matter, mainframe 300 may comprise an Input/Output (I/O) device 308 such as a display, a terminal, a printer, a tape drive, a network communications device, or the like. I/O device 308 may be utilized to provide output to and receive input from a user, such as configuring one or more applications, OS settings, or the like.

In some exemplary embodiments of the disclosed subject matter, mainframe 300 may comprise or be operatively connected to one or more storage devices 312. Storage device 312 may be a hard disk drive, a Flash disk, a Random Access Memory (RAM), a memory chip, real storage, main storage or the like. In some exemplary embodiments, storage device 312 may retain program code operative to cause processor 304 to perform acts associated with any of the programs executed by mainframe 300, such as the methods shown in FIGS. 1-2 above. The components detailed below may be implemented as one or more sets of interrelated computer instructions, executed for example by processor 304 or by another processor. The components may be arranged as one or more executable files, dynamic libraries, static libraries, methods, functions, services, or the like, programmed in any programming language and under any computing environment.

Storage device 312 may store routines 316 implementing low level control events. In accordance with the disclosure, a minimal number of such routines may be maintained, such as mount-, unmount- and rewind-related events. Routines 316 may substitute at least one OS routine executed by the mainframe computer, such that calls to these OS routines may be intercepted. Alternatively, routines 316 may precede the OS routines in queue, and thus be performed instead of the OS routines if applied to cloud storage, and before the OS routines without taking actual actions if applied to any other storage such as DASD, tape or others.

Storage device 312 may store SAM EOB routine(s) 320, for substituting the SAM EOB routine of the OS. SAM EOB routine(s) 320 may activate the cloud agent module to transmit or retrieve data from the cloud storage. SAM EOB routine(s) 320 may be implemented as separate routines for read and write, or as one routine.

Storage device 312 may store exit routine(s) 324, which may be called by the OS in certain points, to enable the performance of certain instructions prior to continuing to carry out their operation. Exit routine(s) 324 may be called by the open routine, close routine, end of file routine and possibly additional routines of the OS. Exit routine(s) 324 may be implemented as a single exit routine that handles all cases, as separate exit routines, or a combination thereof.

Storage device 312 may store cloud data management server 328, for managing the operations, for example providing a user interface for a user to generate reports, search data, delete data, or the like.

Storage device 312 may store code in a high level language code, such as cloud agent module 332, adapted to read and write data to and from cloud storage 336. Cloud agent module 332 may be adapted to read and write meta data from and to cloud 336. 332 improve or optimize data read and write operations from and to cloud storage 336, or the like. Cloud agent module 332 may also manipulate the data or perform other operations on the data such as sorting, filtering, or the like. Cloud agent module 332 may also read a data set directly from a backup, archive, full volume dump, a Unix file backup or an open system file residing on the cloud storage, and may stream that data through the standard z/OS access methods such as QSAM or BSAM. Without this mechanism, operations, for example, sorting, are particularly complex operations, since they require reading all the data, sorting the data, writing it back to the tape/DASD and only then reading it in a sorted manner by the application. The data is thus stored as unsorted, and is being sorted while it is being read.

Cloud storage 332 can be implemented as any storage system and in particular object storage system, and may or may not be on-premise, and may be private or public.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method performed by a mainframe computer, the method comprising:

determining an allocating of a dataset request by an application executed by an operating system (OS) of the mainframe computer;

intercepting, at a mount/unmount routine executing in place of an existing mount/unmount routine of the OS, a mount request issued by the OS in response to the allocating of the dataset request by the application;

determining whether the dataset request should be processed at the mount/unmount routine or provided to the existing mount/unmount routine, based on whether the dataset request is designated for implementation using a simulated tape having a simulated volume within cloud storage or using a physical tape;

simulating, at the mount/unmount routine and in response to the mount request and to the determining that the dataset request is designated for implementation using the simulated tape having the simulated volume within the cloud storage, a mounting of the simulated tape;

receiving, from an open/close routine executing in place of an existing open/close routine of the OS, a first exit call to a cloud agent module to prepare for dataset write by the application to the simulated volume of the simulated tape, via the cloud agent module;

opening, by the cloud agent module, a dataset on the simulated volume within the cloud storage;

intercepting, by a Basic Sequential Access Method (BSAM) End of Block (EOB) write routine executing in place of an existing BSAM EOB write routine of the OS, a first data block and a second data block written by the application to the OS;

sending, by the cloud agent module, the first data block and the second data block in a data chunk to the cloud storage;

receiving, from the open/close routine, a second exit call for finalizing writing of the dataset to the cloud storage;

intercepting, at the mount/unmount routine, an unmount request; and simulating, at the mount/unmount routine, unmounting of the simulated tape, in response to the unmount request.

2. A computer-implemented method performed by a mainframe computer, the method comprising:

determining an allocating of a dataset request on a volume identifier by an application executed by an operating system (OS) of the mainframe computer;

intercepting, at a mount/unmount routine executing in place of an existing mount/unmount routine of the OS, a mount request issued by the OS in response to the allocating of the dataset request by the application;

determining whether the dataset request should be processed at the mount/unmount routine or provided to the existing mount/unmount routine, based on whether the dataset request is designated for implementation using a simulated tape having the volume identifier within cloud storage or using a physical tape;

simulating, at the mount/unmount routine and in response to the mount request and to the determining that the dataset request is designated for implementation using the simulated tape having the volume identifier within the cloud storage, a mounting of the simulated tape;

receiving, from an open/close routine executing in place of an existing open/close routine of the OS, a first exit call to a cloud agent module to prepare for dataset read by the application from the simulated volume of the simulated tape, via the cloud agent module;

opening, by the cloud agent module, a dataset on the simulated volume within the cloud storage;

intercepting, by a BSAM EOB read routine executing in place of an existing BSAM EOB read routine of the OS, a first data block and a second data block read from the simulated volume;

reading the first data block and the second data block from cloud storage in a data chunk;

receiving, from the open/close routine, a second exit call for finalizing reading of the dataset from the cloud storage;

intercepting, at the mount/unmount routine, an unmount request; and simulating, at the mount/unmount routine, unmounting of the simulated tape, in response to the unmount request.

3. A computer program product comprising a computer readable storage medium retaining program instructions for using cloud storage by a mainframe computer, the program instructions comprise:

a mount/unmount routine executing in place of an existing mount/unmount routine of an OS of the mainframe computer and configured, when executed, to receive a mount request in response to an allocating of a dataset request by an application executed by the OS, wherein the mount/unmount routine is further configured to determine whether the dataset request should be processed at the mount/unmount routine or provided to the existing mount/unmount routine, based on whether the dataset request is designated for implementation using a simulated tape having a simulated volume within cloud storage or using a physical tape, and simulate, in response to the mount request and to the determining that the dataset request is designated for implementation using the simulated tape having the simulated volume within the cloud storage, a mounting of the simulated tape;

an open/close routine executing in place of an existing open/close routine of the OS and configured, when executed, to execute a first exit call to prepare for dataset read/write by the application from/to the simulated volume of the simulated tape;

a BSAM EOB read/write routine executing in place of an existing BSAM EOB read/write routine of the OS, and configured, when executed, to determine a first data block and a second data block read from the cloud storage or written by the application to the OS and included in the dataset; and a cloud agent module executed by the OS and configured, when executed, to read a data chunk that includes the first data block and the second data block from the dataset in the simulated volume, or to write the data chunk that includes the first data block and the second data block to the dataset in the simulated volume, in response to a BSAM EOB call from the BSAM EOB read/write routine and at least one exit call from the open/close routine, and further configured to instruct the mount/unmount routine to unmount the simulated tape upon completion of the reading/writing of the dataset.

4. The computer program product of claim 3, wherein the computer program product comprises program instructions for storing and retrieving at least one data object to and from the cloud storage in parallel.

5. The computer program product of claim 3, wherein the computer program product comprises program instructions for storing and retrieving at least two data objects to and from the cloud storage in an order other than an order in which the at least two data objects are referred to by the application executed by the mainframe computer.

6. The computer program product of claim 3, further comprising a cloud data management module for providing user interface for a user of the mainframe computer.

7. The computer program product of claim 3, wherein the cloud agent module is adapted to encrypt data prior to transmitting the data to the cloud storage, and decrypt the data when reading from the cloud storage.

8. The computer program product of claim 3, wherein the cloud agent module is adapted to compress data prior to transmitting the data to the cloud storage, and decompress the data when reading from the cloud storage.

9. The computer program product of claim 3 wherein the cloud agent module is adapted, upon a request by the application, to filter or sort data prior to providing the data to the application.

10. The computer program product of claim 3 wherein the cloud agent module is adapted, upon a request by the application, to read a data set directly from a backup, archive, full volume dump, a Unix file backup or an open system file residing on the cloud storage.

11. The computer-implemented method of claim 1, wherein the application is written in Cobol, PL1, Fortran, or HLASM.

12. The computer-implemented method of claim 2, wherein the application is written in Cobol, PL1, Fortran, or HLASM.

13. The computer program product of claim 3, wherein the application is written in Cobol, PL1, Fortran, or HLASM.

\* \* \* \* \*